S. I. FEKETE.
PISTON FOR INTERNAL COMBUSTION ENGINES.
APPLICATION FILED MAY 20, 1921.

1,401,899.  Patented Dec. 27, 1921.

INVENTOR:
Stephen S. Fekete
by Macleod, Calver, Copeland & Dike
Attys.

UNITED STATES PATENT OFFICE.

STEPHEN I. FEKETE, OF DETROIT, MICHIGAN, ASSIGNOR TO ESSEX MOTORS, OF DETROIT, MICHIGAN, A CORPORATION OF MICHIGAN.

PISTON FOR INTERNAL-COMBUSTION ENGINES.

1,401,899.  Specification of Letters Patent.  Patented Dec. 27, 1921.

Application filed May 20, 1921. Serial No. 471,101.

*To all whom it may concern:*

Be it known that I, STEPHEN I. FEKETE, a citizen of the United States, residing at Detroit, county of Wayne, State of Michigan, have invented a certain new and useful Improvement in Pistons for Internal-Combustion Engines, of which the following is a specification, reference being had therein to the accompanying drawings.

My present invention relates to pistons for use in internal combustion engines and has to do particularly with so-called aluminum pistons which, owing to the high coefficient of expansion and other characteristics of the material from which the piston is constructed, are likely to cause trouble on account of imperfect fit in the cylinders and for other reasons. The particular object of the invention is to produce a piston which can be made of aluminum alloy and which may be fitted to the cylinder in which it is to be used as closely as the ordinary cast-iron piston, thereby doing away with piston ring troubles, with the passage of excessive amounts of oil into the combustion chamber, with piston slap and with danger of the piston sticking. I have found by actual experience that aluminum pistons constructed in accordance with the herein described invention may be fitted substantially as closely as the ordinary cast-iron piston and, when so fitted, the passage of excessive amounts of oil in the combustion chamber is practically eliminated. Furthermore, the piston is so constructed that it conducts oil automatically from the cylinder walls to the wrist pin bearing, thus completely lubricating the parts. Piston slap and wear of the wrist pin are greatly reduced by my invention.

The invention will be fully understood from the following description when taken in connection with the accompanying drawings, and the novel features thereof will be pointed out and clearly defined in the claim at the close of the specification.

In the drawings, Figure 1 is a side elevation of a piston embodying my invention.

Figure 1:
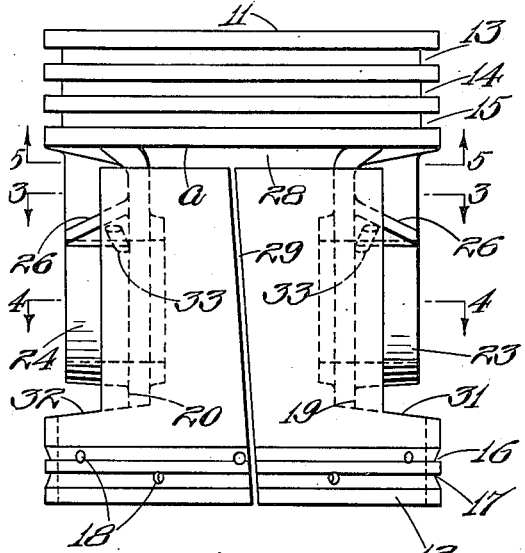
Figure 2:
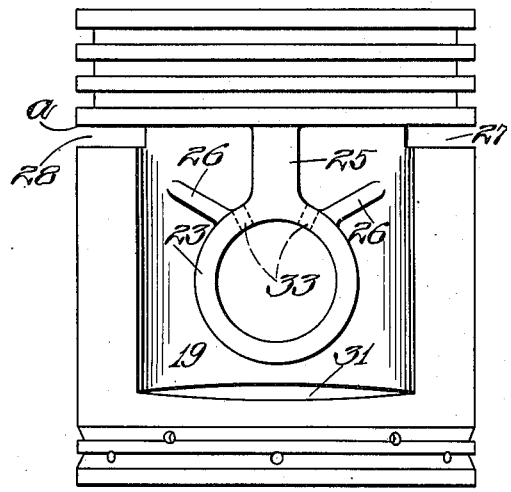
Fig. 2 is a side elevation taken at right angles to Fig. 1.
Figure 3:
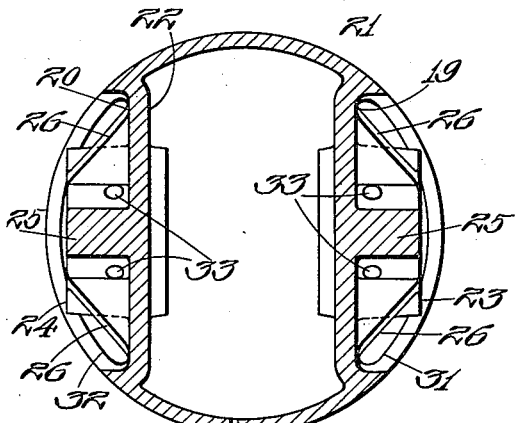
Fig. 3 is a horizontal section looking down, taken on line 3—3 of Fig. 1.
Figure 4:
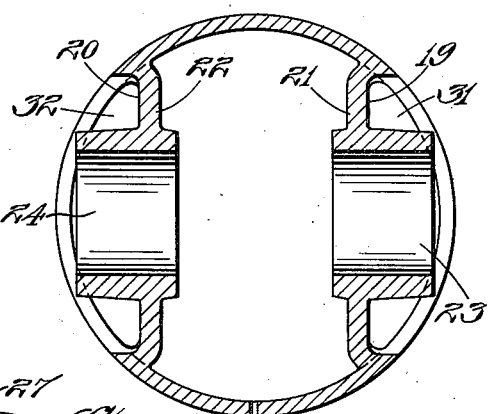
Fig. 4 is a horizontal section taken on line 4—4 of Fig. 1.
Figure 5:
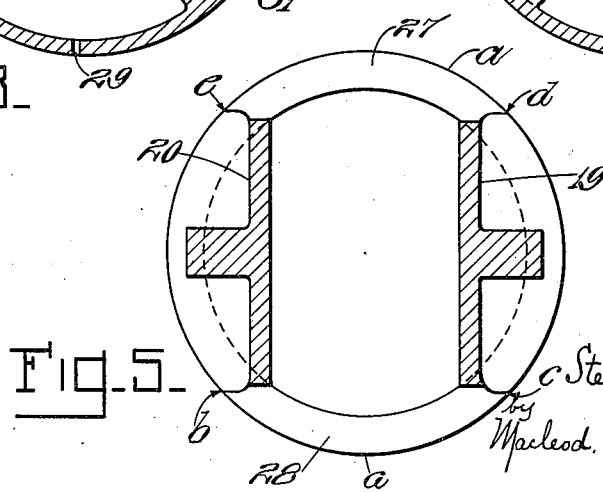
Fig. 5 is a horizontal section taken on line 5—5 of Fig. 1.

Referring now to the drawings, the top of the piston is indicated at 11 and the skirt at 12. The top of the piston is provided with a plurality of piston ring grooves 13, 14 and 15, three being employed in the piston shown in the drawings. The bottom of the piston is provided with two oil scraper grooves 16 and 17 provided with oil ports 18 through which oil collected in the said grooves may return to the interior and thence to the sump. On two opposite sides of the piston, the walls are recessed, as shown at 19 and 20, this portion of the wall being designated 21 and 22 (see Figs. 3 and 4 particularly), and wrist pin bearings 23 and 24 are formed integral therewith and extend outwardly from the recessed walls 21 and 22. Each bearing is stiffened by a heavy vertical web 25 and two inclined webs 26 (see Figs. 2 and 3). At 27 and 28 are shown two horizontal slots piercing the wall of the piston below the lowest ring groove 15. The upper edges of the two slots 27 and 28 are in line with the upper edge of the recesses 19 and 20 and continuous therewith so that an oil-scraping edge *a* is formed all the way around the piston.

On one side of the piston is a substantially vertical slot 29 running from the bottom edge of the skirt of the piston to the slot 28. This slot is formed preferably on the side of the piston opposite to the wall of the cylinder against which the piston is thrown by the impact of the explosion and enables the piston to collapse slightly when subjected to the stresses to which it is liable and therefore is one of the factors which makes possible the relatively close fitting of the piston in the cylinder.

On each side of the piston and at the bottom of the recesses 19 and 20 are slots 31 and 32 also piercing the wall of the piston. Also at the bottom of the space between the two webs 26 and the vertical web 25 are oil holes 33 which lead to the bearing surface of the piston pin bearing.

From the foregoing it will be seen that the edge *a* which extends all the way around the piston, scrapes the oil from the cylinder walls. That portion of the oil removed by the edge *a* between the points *b* and *c* passes through the slot 28 to the interior of the piston and thence back to the crank case or sump. In a similar manner a portion of the oil removed by the portion of the edge *a* between the points *d* and *e* passes through the slot 27 into the interior of the piston. The portion of the oil removed by the portion of the edge *a* between the points *c* and *d* falls into the recess 19. A portion of it is directed by the webs 26, 26 into the oil holes 33, 33, thereby lubricating the wrist pin bearing 24. The remainder of this oil passes down through the recess 19 and escapes through the slot 31 into the interior of the piston and thence to the crank case or sump. The oil removed by the portion of the edge *a* between the points *e* and *b*, follows a similar path, part of it lubricating the wrist pin bearing and the remainder passing through the slot 32 to the interior of the piston. It will, therefore, be seen that provision is made for the immediate escape to the interior of the piston of all the oil scraped off the walls of the cylinder by the edge *a* and at the same time effective automatic lubrication is provided for the wrist pin bearing.

What I claim is :—

A piston for an internal combustion engine having near the top thereof an oil scraping edge and on two opposite sides, recesses, the walls of which support wrist pin bearings, there being oil holes through the walls of said recesses, and inclined web members which guide the oil removed by said scraping edge into said oil holes.

In testimony whereof I affix my signature.

STEPHEN I. FEKETE.